Figure 1:
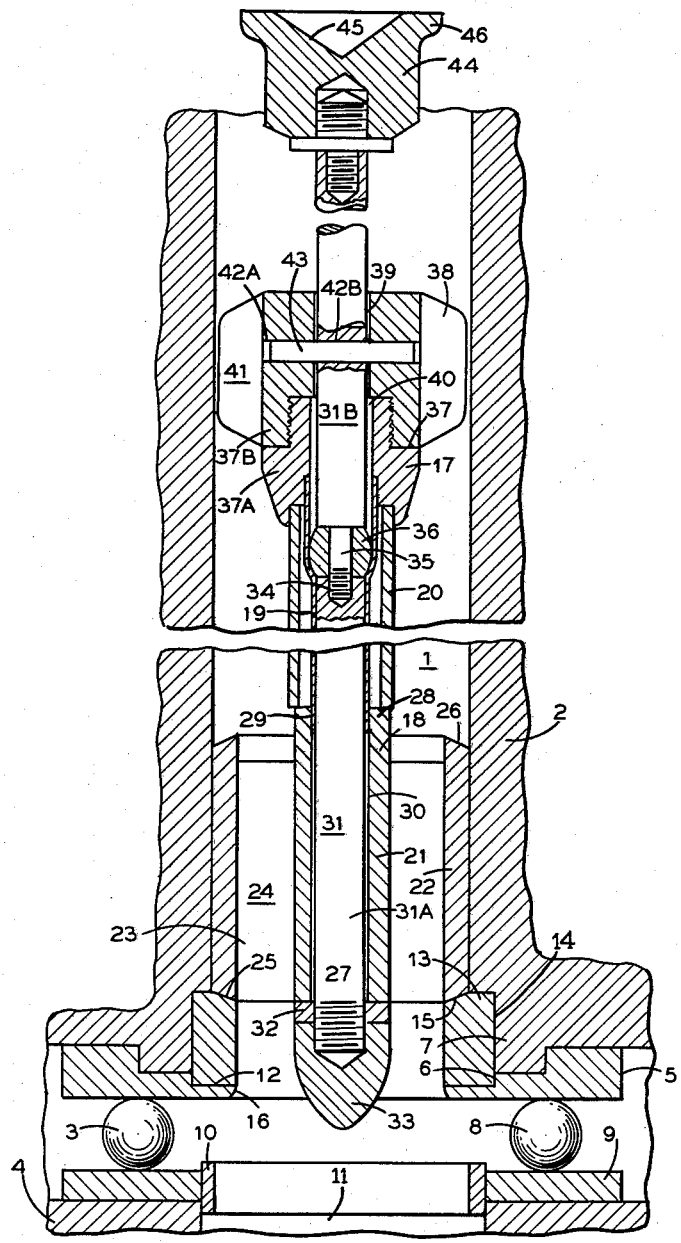

Aug. 18, 1964   J. S. PICTON ET AL   3,144,918
SHOCK ABSORBERS

Filed Oct. 20, 1960   2 Sheets-Sheet 1

INVENTORS
James S. Picton
Anthony J. Taylor
BY
*J. P. Moran*
ATTORNEY

Aug. 18, 1964   J. S. PICTON ET AL   3,144,918
SHOCK ABSORBERS

Filed Oct. 20, 1960   2 Sheets-Sheet 2

INVENTORS
James S. Picton
Anthony J. Taylor
BY
ATTORNEY

United States Patent Office 3,144,918
Patented Aug. 18, 1964

3,144,918
SHOCK ABSORBERS
James S. Picton and Anthony J. Taylor, London, England, assignors to Babcock & Wilcox Limited, London, England, a British company
Filed Oct. 20, 1960, Ser. No. 63,906
Claims priority, application, Great Britain, Oct. 21, 1959, 35,644/59
6 Claims. (Cl. 188—1)

This invention relates to shock absorbers and more particularly to shock absorbers for use in connection with gas-cooled nuclear reactors having cores with upright fuel channels. In a gas-cooled, graphite-moderated reactor the fuel elements when made of natural uranium are encased in a protective thin sheath of a magnesium alloy. Such a fuel element is of high density and low strength and is operated at temperatures near the acceptable limits for the magnesium alloy and the uranium. Should the sheath burst, the release of fission product gases would quickly contaminate the whole coolant circuit with radioactivity and the contamination would be increased when, as is customary, the coolant is carbon dioxide gas, through corrosion by the gas of the uranium.

The danger exists that owing to a fault a fuel element may fall freely down a fuel channel from the charging chute. In such event the fuel element will gain considerable kinetic energy during its fall and upon impact at the bottom of the fuel channel will become severely damaged. Moreover, the impact may damage the fuel element support at the bottom of the channel and may also cause dislocation or fracture of the ball race on which rest the blocks of moderating material forming the channel. Similarly, in the event of a control rod falling within its channel the resulting impact may cause damage to the rod or to parts with which it impacts. It is therefore necessary to provide safeguards against these eventualities.

An object of the invention is the provision of a simple but effective form of shock absorber. A particular object is the provision of shock absorbers suitable for giving protection against damage caused by the inadvertent free falling of fuel elements or control rods within vertical channels in the core of a gas-cooled nuclear reactor.

A shock absorber according to the present invention is adapted to dissipate kinetic energy of a moving body through expansion of a tube effected by relative movement longitudinally of the tube between the tube which is supported at opposite end parts against lateral movement and a member dimensioned to make an interference fit with the interior of the tube and mounted on a rod, the tube and rod being relatively longitudinally movable and guide means being arranged to act between the rod and the tube and serving to guide the member axially of the tube during relative motion therebetween.

The invention also includes a gas-cooled nuclear reactor having a core with upright fuel channels provided at their lower ends with respective shock absorbers according to the invention.

Figure 2:
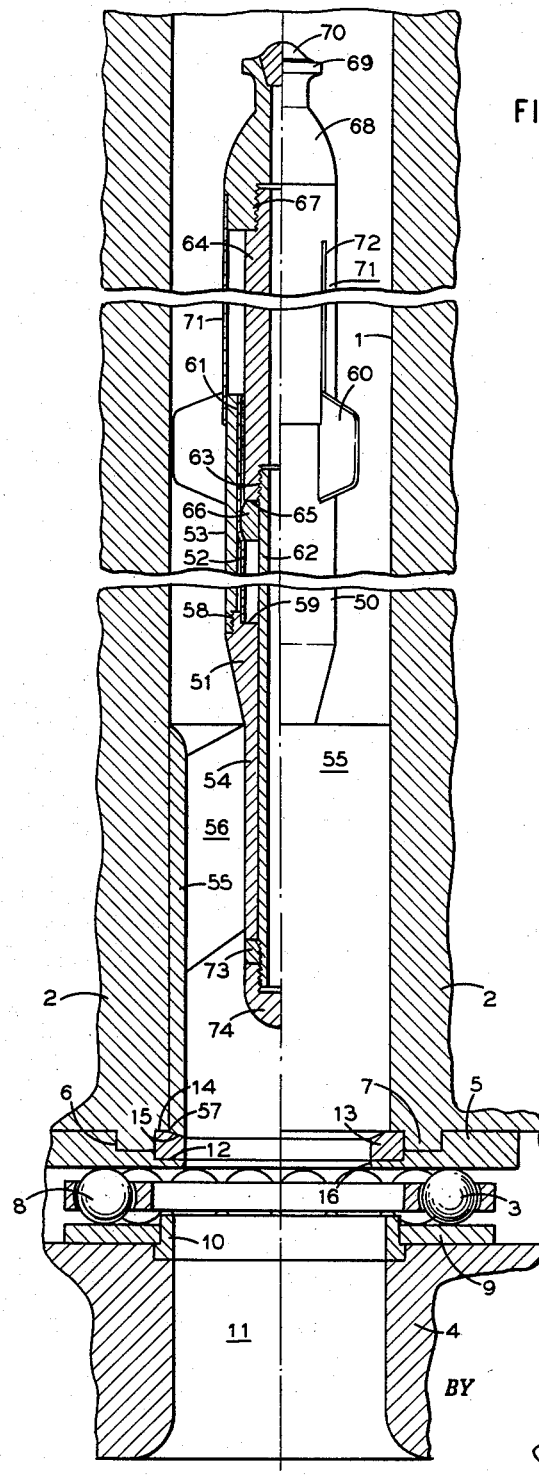

The invention will now be described, by way of example, with reference to the accompanying partly diagrammatic drawings, in which:

FIGURE 1 is a sectional side elevational of a shock absorber in position at the lower end of a fuel element channel of a gas-cooled nuclear reactor, vertically extending sections of the shock absorber being omitted to reduce the vertical extent of the view; and, FIGURE 2 is a partly sectional elevation of a modified form of shock absorber in position at the lower end of a fuel channel of a gas-cooled nuclear reactor, the right hand half of the shock absorber being in elevation whilst the left hand half is in section, and vertically extending sections of the shock absorber being omitted to reduce the vertical extent of the view.

In FIGURE 1, the lower part of an upright fuel element channel 1 of circular cross-section passes through a graphite block 2 comprised in a lower part of the pile of a gas-cooled nuclear reactor. The graphite block 2 rests upon a large ball race 3 which is supported on a lower support grid 4, an upper annular plate 5 of the ball race 3 having an upper, radially inner annular recess 6 receiving a complementary annular shoulder 7 formed on the block 2 around the lower end of the channel 1, the plate 5 supporting the block 2 and resting on a circular series of balls 8 which are supported on a lower annular plate 9 of the ball race, the plate 9 resting on the support grid 4. An upright short cylinder 10, of internal diameter equal to that of the fuel element channel 1 is secured centrally to the plate 9 to provide a passageway therethrough, the cylinder 10 projecting below the plate 9 and fitting within the upper end of an upright gas passage 11 in the support grid 4. The cylinder 10 is axially aligned with the fuel element channel 1 for the upward flow of coolant gas through the grid 4 and into the channel 1.

The inner diameter of the plate 5 is smaller than that of the fuel element channel 1, and the upper surface of the plate 5 is stepped to provide an innermost recess 12 in which is seated an annular support ring 13. The support ring 13, of inner diameter equal to that of the plate 5, fits within an annular recess 14 formed in a lower part of the block 2 and surrounding the channel 1, and at its upper edge, radially inwardly of the block 2, the ring 13 is formed with a downwardly tapering annular support surface or seating 15. The plate 5 is radiused at its radially inner, lower periphery 16 to provide for smooth entry of the upflowing gases.

A shock absorber 17 is slidably mounted in the fuel element channel 1 above the support ring 13 and comprises a tube support piece 18 supporting an expandable tube 19 and a tubular sheath 20 for the tube 19. The tube support piece 18 comprises an inner sleeve 21 and an outer sleeve 22, coaxially arranged and connected by radial webs 23 which terminate short of the upper and lower ends of the outer sleeve 22. The webs 23 are of plate form and are circumferentially distributed to provide flow passages 24 therebetween. The outer sleeve 22 has an inner diameter equal to that of the support ring 13 and an outer diameter such that the sleeve 22 is a free sliding fit in the fuel element channel 1. At its lower end the sleeve 22 is formed with a downwardly tapering surface 25 complementary to the support surface or seating 15 of the ring 13 on which it is seated, and at its upper end the sleeve 22 is formed with an upwardly tapering surface 26 which serves to reduce risk of interference with or scoring of the inner surface of the channel 1 on upward movement or lifting of the sleeve 22.

The inner sleeve 21 at its lower end 27 terminates adjacent the lower end of the sleeve 22 and at its upper end 28 projects above the upper end of the sleeve 22. The upper end 28 is formed with a radially inner recess 29 in which is seated the lower end of the expandable tube 19, the tube 19 extending upwardly, coaxial to the sleeve 21 which is formed centrally with an upright bore 30 of diameter less than the inner diameter of the tube 19. An upright rod 31 is slidably mounted in the bore 30 and at its lower end the rod is threaded and carries a support collar 32 and a lower locking cap 33, both threaded onto the lower end of the rod 31 and of outer diameter equal to that of the inner sleeve 21. The locking cap 33 is formed with a suitably faired profile as regards the upward flow of gas from the lower passage 11 into the channel 1, and the cap 33 and collar 32 serve to close the lower end of the inner sleeve 21.

The rod 31 is suitably of ground steel and is formed as two parts, a lower part 31A terminating at its upper end at a location below the upper end of the expandable tube 19, and an upper part 31B extending upwardly from said location, the lower part 31A having a threaded aperture 34 at its upper end receiving a threaded lower portion 35, of reduced diameter, of the upper part 31B. A hardened steel collar 36 is mounted on the portion 35 of reduced diameter and is clamped between the two parts of the rod 31. The collar 36 is of barrel-like form, closely fitting onto the portion 35 of reduced diameter and is dimensioned to make an interference fit with the interior of the tube 19. The upper part of the tube 19 above the collar 36 is of suitably increased internal diameter to permit ease of entry of the collar into the tube for assembly purposes.

The inner sleeve 21 of the support piece 18 is connected by the upright tubular sheath 20 to an upper tube support piece 37. The sheath 20 has an internal diameter greater than the external diameter of the tube 19 by an amount sufficient to permit the desired expansion of tube 19, and at its lower end is united by welding to the upper end of the inner sleeve 21. At its upper end the sheath 20 is united by a suitable screwed connection to the upper tube support piece 37 which comprises two parts, a lower part 37A united to the sheath 20, and an upper part carrying the fins 38, the parts 37A and 37B being joined by a screw threaded connection. The upper part 31B of the rod 31 extends upwardly through and makes a sliding fit with an upright bore 39 in the upper part 37B of the upper support piece 37, and also extends centrally through an upright bore 40 of greater diameter, formed in the lower part 37A of the upper support piece 37. The bore 40 of greater diameter permits entry, during assembly of the shock absorber 17, of the steel collar 36.

The upper part 37B of the upper support piece 37 carries a circumferentially spaced series of radial fins 38 which are of plate form and define flow passages 41 therebetween for the upward flow of gas through the fuel element channel 1. The fins 38 are adapted to engage the inner wall of the channel 1 with a free sliding fit and serve to hold the upper end of the shock absorber centrally of the channel 1. The part 37B of the upper support piece 37 is provided with a transverse bore 42A aligned with a transverse bore 42B formed in the upper part 31B of the rod 31. A shear pin 43 passes through the bores 42A and 42B and is suitably notched to give a desired resistance to fracture. The shear pin 43 serves to determine the normal relative axial positions of the collar 36 and the expandable tube 19, and the minimum load at which the shock absorber will operate.

The upper part 31B of the rod 31 extends upwardly above the upper portion 37B of the upper support piece 37 and at its upper end is provided with a boss 44 suitably secured by a screwed connection and shaped for engagement by a fuel element grab head, the boss 44 providing a seating for a fuel element. To this end the boss 44 is formed in its upper surface with a central recess 45 of downwardly convergent conical form providing a seating for a complementary projection on a fuel element container and is also formed with a radially outer shoulder 46 for engagement with grab means of a fuel element grab-head.

In operation, the shock absorber 17 is supported at the lower end of the channel 1 by engagement of the lower end surface 25 of the outer sleeve 22 with the upper end surface 15 of the support ring 13. Should a fuel element inadvertently fall through the channel 1 onto the seating 45 provided in the boss 44, the shear pin 43 is ruptured and the hardened steel collar 36 is forced downwardly into the tube 19 which is thereby expanded so that the kinetic energy or a large part thereof of the fuel element is absorbed and the fuel element is relatively gradually brought to rest.

It will be understood that a desired resistance to movement offered by the shock absorber may be obtained by suitable choice of the thickness of the tube 19 and the length of the tube 19 may be chosen to ensure absorption of the required amount of energy.

In the operation of a nuclear reactor, a shock absorber, after removal of the superjacent fuel elements, may itself readily be withdrawn and replaced. The tube 19 is enclosed between the rod 31 and the sheath 20 and is thereby protected from mechanical damage, the tube 19 and the collar 36 being protected from corrosion due to gas flowing through the passages 24.

During actuation of the shock absorber, since the tube 19 is firmly positioned at both its upper and its lower end, and the rod 31 is guided both at the lower support piece 18 and the upper support piece 37, substantial coincidence of the axes of the tube and rod is maintained and a substantially predetermined energy absorption by the shock absorber is ensured.

In the modification of FIGURE 2, where like reference numerals refer to similar parts in FIGURE 1, the lower part of an upright fuel element channel 1 of circular cross-section passes through a graphite block 2 which rests upon a large ball race 3 supported on a lower support grid 4.

A shock absorber 50 is slidably mounted in the channel 1 above the support ring 13 and comprises a lower tube support piece 51 supporting an expandable tube 52 and an outer tubular sheath 53 for the tube 52. The support piece 51 comprises an inner sleeve 54 and an outer sleeve 55 joined by a circular series of radial webs 56 of plate form to provide gas flow passages therebetween. The outer sleeve 55 is slidable within the channel 1 and extends downwardly beyond the lower end of the inner sleeve 54, terminating at its lower end with a downwardly tapering surface 57 engaging a complementary seating formed on the support ring 13. At its upper end the outer sleeve is flared outwardly at its inner surface above the webs 56 to help provide a smooth outlet from the gas flow passages between the webs 56.

The inner sleeve 54 is flared outwardly at its outer surface above the webs 56, helping to provide a smooth outlet from said gas flow passages and at its upper end is formed with threaded part 58 onto which is connected the lower end of the sheath 53. Internally of the threaded part 58, the flared part of the inner sleeve 54 is formed with an annular recess 59 into which the lower end of the expandable tube 52 is tightly seated. The sheath 53 extends upwardly coaxial with the channel 1 and at its upper end is provided with a circular series of three radial vanes 60 adapted slidably to engage the internal wall of the channel 1 and help hold the sheath 53 in correct axial position. The expandable tube 52 extends upwardly throughout the length of the sheath 53 and at its upper end is expanded as at 61 tightly to fit within the bore of the sheath 53 and hold the upper end of the tube 52 in correct axial position. Below the expanded portion the tube 52 has an outer diameter smaller than the inner diameter of the sheath 53 by an amount sufficient to allow for the desired expansion of the tube 52.

A rod 62 in the form of a tube is slidably mounted in the lower sleeve 54 and extends upwardly within the tube 52 to a location above the bottom of the expanded portion 61 thereof, and at its upper end is joined by a screw threaded connection 63 to a rod 64 also of tubular form but of greater external diameter than that of the rod 62 so that a shoulder 65 is provided at the connection between the rods 62 and 64. A collar 66 of hardened steel is slidably mounted on the rod 62, above the lower sleeve 54 and below the shoulder 65, the collar 66 being of barrel-like form, closely fitting onto the rod 62 and dimensioned to make an interference fit with the interior of the part of the tube 52 below the expanded portion 61 thereof.

The rod 64 extends upwardly above the vanes 60 a distance substantially equal to the length of the unexpanded portion of the tube 52 and at its upper end is joined by a threaded connection 67 to a lifting member 68 formed with a central bore and a lifting flange 69 at its upper end. The bore of the lifting member is closed at its upper end by a plug 70 having an upper convex surface adapted to provide a seating for a fuel element container.

A shroud 71, of cylindrical form, is secured at its upper end to the lifting member 68 and extends downwardly, coaxial with the rod 64 to a level below the upper edges of the vanes 60. The shroud 71 is provided with three upright slots 72 extending downwardly from adjacent the member 68 and open at their lower ends where they engage respective vanes 60, and is of internal diameter such as to be a sliding fit with the outside of the sheath 53. The shroud 71 serves to guide the rod 64 in coaxial relationship with the tube 52 and also serves to help protect the rod from exposure to gases flowing upwardly through the channel 1.

The lower end of the rod 62 is threaded and carries a threaded collar 73 which serves to clamp the sleeve 54 against the lower end of the expandable tube 52 and to urge the collar 66 downwardly into the tube 52.

The collar 73 is locked in position by a cap member 74 threaded onto the lower end of the rod 54 below collar 73 and having an inverted dome shaped profile adapted to reduce resistance to and disturbance of gas flowing into the fuel element channel 1.

In operation, in the event of inadvertent falling of a fuel element within the fuel channel 1, the impact is taken by the lifting member 68 through the plug 70 and the member 68 with the shroud 71, the upper rod 64, the lower rod 62 and the expanding member 66 are forced downwardly. The tube 52 is expanded by downward movement of the expanding member 66 which is maintained coaxial with the tube 52 by virtue of the rod 62 which is guided at its lower end by the inner sleeve 54 and at its upper end by the centering action of the shroud 71 sliding telescopically over the outer surface of sheath 53.

Since the tube 52 is held coaxial to the sheath 53 at its upper end by tightly fitting therein and at its lower end by seating in the recess 59, tendency for the tube to deflect from its correct coaxial position is resisted.

It will be understood that on impact of a fuel element with the member 68, an initial elastic shockwave will be set up which will react on the element with possibly damaging effects. In order to reduce the amplitude of this initial shock loading and consequent shock to the fuel element, the tube 52 may be prestressed in order to lessen the additional force, due to impact, which will cause it to expand under the influence of the expander member 66. To this end, the collar 73 may be tightened to urge the expander member 66 downwardly, placing the rod 62 under tension and the tube 52 under compression.

It will be appreciated that after operation of a shock absorber by expansion of the tube 52, the shock absorber may be withdrawn from the channel 1 and replaced by a fresh unit. Dismantling of the shock absorber after operation is facilitated by the sliding relationship between rod 62 and expanding member 66, release of the cap 74 and collar 73 allowing upward withdrawal of shroud 71, member 68, rod 64 and rod 62, the expanding member 66 being left tightly fitted in the tube 52. The sheath 53 may then be released from its screw threaded connection 58 with the inner sleeve 51 removed together with the expanded tube 52 and expanding member 66 and replaced by a fresh sheath 53 into which a fresh tube 52 is fitted and a fresh expanding member 66 which is slidably mounted on the rod 62 before reassembling the shock absorber.

It will be understood that the prestressing of the expandable tube described in connection with the FIGURE 2 embodiment could be applied in like manner to the embodiment of FIGURE 1 if the shear pin 43 were omitted. Alternatively, in the embodiment of FIGURE 1 the shear pin could be retained provided the arrangement were such that during assembly the tube 19 was prestressed by tightening the collar 32 in order to bring the bore 42B in the rod 31 into alignment with the bore 42A in the upper part 37B of the support piece 37. It will be appreciated that the bore 42B would be so positioned axially of the rod 31 with respect to the member 36 that during assembly with the member 36 freely slidingly fitted to the unit of its movement into the widened end part of the tube 19, the bore 42B would be displaced upwardly from its position of alignment with the bore 42A and so that on tightening of the collar 32 the member 36 would be urged downwardly into the tube until the pin 43 could be fitted into the bores 42A and 42B. With a shock absorber so assembled, operation thereof below a force necessary to shear the pin would be prevented and on exceeding such a necessary force the initial elastic shockwave would be of reduced amplitude.

What we claim is:

1. A shock absorber for dissipating the kinetic energy of a moving body comprising a deformable tubular member and a movable member, said movable member extending through said tubular member and movable relative there to upon impact by said moving body, means connected to said movable member having an interference fit within said tubular member to expand said tubular member upon movement of said movable member, and a tubular sheath encasing said tubular member and supporting each end thereof, one end of said movable member extending beyond the corresponding end of said sheath and adapted to receive said impact, the second end of said movable member extending beyond the corresponding end of said sheath and mating therewith to cap said corresponding end of said sheath.

2. A shock absorber for dissipating the kinetic energy of a moving body comprising a deformable tubular member and a movable member, said movable member extending through said tubular member and movable relative thereto upon impact by said moving body, collar means connected to said movable member having an interference fit within said tubular member to expand said tubular member upon movement of said movable member, and a tubular sheath encasing said tubular member and supporting each end thereof, one end of said movable member extending beyond the corresponding end of said sheath and adapted to receive said impact, the second end of said movable member extending beyond the corresponding end of said sheath and mating externally therewith to cap said corresponding end of said sheath, the ends of said tubular sheath arranged to center and guide said movable member throughout its travel.

3. A shock absorber for dissipating the kinetic energy of a moving body comprising a deformable tubular member and a movable member, said movable member extending through said tubular member and movable relative thereto upon impact by said moving body, collar means removably connected to said movable member having an interference fit within said tubular member to expand said tubular member upon movement of said movable member, and a tubular sheath encasing said tubular member and removably supporting each end thereof, one end of said movable member extending beyond the corresponding end of said sheath and adapted to receive said impact, the second end of said movable member extending beyond the corresponding end of said sheath and mating externally therewith to cap said corresponding end of said sheath, the ends of said tubular sheath arranged to center and guide said movable member throughout its travel.

4. A shock absorber for dissipating the kinetic energy of a moving body comprising a deformable tubular member and a movable member, said movable member extending through said tubular member and movable relative thereto upon impact by said moving body, collar means removably connected to said movable member having an interference fit within said tubular member to expand said tubular member upon movement of said movable member, and a tubular sheath encasing said tubular member and removably supporting each end thereof, one end of said movable member extending beyond the corresponding end of said sheath and adapted to receive said impact, the second end of said movable member extending beyond the corresponding end of said sheath and mating externally therewith to cap said corresponding end of said sheath, the ends of said tubular sheath arranged to center and guide said movable member throughout its travel, and a shear pin joining said movable member and said tubular sheath.

5. A shock absorber for dissipating the kinetic energy of a moving body comprising a deformable tubular member and a movable member, said movable member extending through said tubular member and movable relative thereto upon impact by said moving body, collar means removably connected to said movable member having an interference fit within said tubular member to expand said tubular member upon movement of said movable member, and a tubular sheath encasing said tubular member and removably supporting each end thereof, one end of said movable member extending beyond the corresponding end of said sheath and adapted to receive said impact, the second end of said movable member extending beyond the corresponding end of said sheath and mating externally therewith to cap said corresponding end of said sheath, the ends of said tubular sheath arranged to center and guide said movable member throughout its travel, and means to prestress said collar in said deformable tubular member.

6. A shock absorber for dissipating the kinetic energy of a moving body comprising a deformable tubular member and a movable member, said movable member extending through said tubular member and movable relative thereto upon impact by said moving body, an enlarged collar slidably connected on said movable member, said collar having an interference fit within said tubular member to expand said tubular member upon movement of said movable member, and a tubular sheath encasing said tubular member and supporting each end thereof, one end of said movable member extending beyond the corresponding end of said sheath and adapted to receive said impact, the second end of said movable member extending beyond the corresponding end of said sheath and mating therewith to cap said corresponding end of said sheath.

References Cited in the file of this patent
UNITED STATES PATENTS

| | | |
|---|---|---|
| 2,857,056 | Dilworth | Oct. 21, 1958 |
| 2,877,170 | Greenhalgh et al. | Mar. 10, 1959 |
| 2,971,566 | Negroni | Feb. 14, 1961 |